United States Patent [19]

Maeyama et al.

[11] Patent Number: 4,496,955
[45] Date of Patent: Jan. 29, 1985

[54] APPARATUS FOR THERMAL PRINTING

[75] Inventors: Sadao Maeyama, Urayasu; Kiyotaka Dochi; Shigemichi Honda, both of Tokyo, all of Japan

[73] Assignee: Sony Corporation, Tokyo, Japan

[21] Appl. No.: 384,284

[22] Filed: Jun. 2, 1982

[30] Foreign Application Priority Data

Jun. 5, 1981 [JP] Japan ................. 56-85686

[51] Int. Cl.³ ............................. G01D 15/10
[52] U.S. Cl. ................. 346/76 PH; 346/138
[58] Field of Search ............... 346/76 PH, 134, 138, 346/46; 400/120; 271/265, 266

[56] References Cited
U.S. PATENT DOCUMENTS

| 3,623,124 | 11/1971 | Platz | 346/46 X |
| 3,951,247 | 4/1976 | Montanari | 400/120 |
| 4,250,511 | 2/1981 | Stein et al. | 346/76 PH |
| 4,390,176 | 6/1983 | Kato | 346/138 |

Primary Examiner—A. D. Pellinen
Assistant Examiner—Todd E. DeBoer
Attorney, Agent, or Firm—Lewis H. Eslinger; Alvin Sinderbrand

[57] ABSTRACT

Apparatus for thermally printing images, such as color images, on a print medium. The medium is moved repeatedly from a reference position through a printing region, as by rotating the medium on a platen. Thermal print elements are disposed at the print region and are selectively energizable to cause images, such as color images, to be printed. A movable web of thermally transferable material has a run interposed between the print medium and the thermal elements at the print region. In one embodiment, the web is provided with successive frames of respectively different colors of thermally transferable material arranged in repeated sequence. Energizing signals are supplied to the thermal elements representative of the image to be printed; and an image is printed in a color corresponding to the color frame then disposed at the printing region. Successive passes of the print medium are made in order to print images of the remaining colors in the sequence of frames on the web.

13 Claims, 8 Drawing Figures

APPARATUS FOR THERMAL PRINTING

BACKGROUND OF THE INVENTION

This invention relates to thermal printing apparatus and, more particularly, to such apparatus wherein an image, such as a color image, is printed on a print medium in response to energizing signals, such as energizing video signals.

Recently, systems have been developed whereby video signals are used to control printing apparatus for printing an image on a suitable print medium, such as plain paper, or the like. Advantageously, the video signals which are used for this printing operation are stored on a suitable record medium, such as a magnetic disc, tape, or other known storage media. Preferably, the video signals may represent a scene; and the printing apparatus permits a "hard copy" of that scene to be formed. In one development, the video signal storage medium is analogous to photographic film for recording an image of the video scene, and this image is "printed" by using the stored video signals to selectively energize a suitable printing device.

Various printing systems are known wherein an image is printed by means of an electrostatic printing system, a dot-impact printing system, an ink jet printing system, or the like. Typically, such printing systems are relatively complex mechanically. The complexity of such systems is magnified when they are used in an attempt to print color images.

Although thermal printing systems are known, such systems are not easily modifiable or controlled so as to permit the thermal printing of video images. There is, consequently, a long-felt need for a thermal printing device which is particularly adapted to print color images on a print medium, such as on paper.

OBJECTS OF THE INVENTION

Therefore, it is an object of the present invention to provide improvements in thermal print apparatus for printing images, such as color images.

Another object of this invention is to provide improved thermal print apparatus which is relatively simple mechanically, is compact, reliable and produces high quality images.

A further object of the present invention is to provide an improved thermal printer which operates to print color images in response to energizing signals, such as in response to color video signals.

An additional object of this invention is to provide an improved color thermal printer which uses a web of thermally transferable material, the web being provided with successive frames of respectively different colors arranged in repeated sequence, and wherein a color image is printed by thermally transferring material from a respective frame to a print medium.

Yet another object of this invention is to provide an improved color thermal printer of the aforenoted type wherein the web of thermally transferable material is controllably movable.

A still further object of this invention is to provide an improved color thermal printer of the aforementioned type, wherein a sequence of frames of thermally transferable color material is used repeatedly for a predetermined number of print operations, and then the web is advanced so as to use the next sequence of frames of thermally transferable color material for subsequent print operations.

Various other objects, advantages and features of the present invention will become readily apparent from the ensuing detailed description, and the novel features will be particularly pointed out in the appended claims.

SUMMARY OF THE INVENTION

In accordance with this invention, thermal print apparatus is provided for printing images on a print medium. The print medium is moved repeatedly from a reference position through a print region. Thermal print elements are disposed at the print region and are selectively energizable to cause images to be printed. A movable web of thermally transferable material has a run interposed between the thermal print elements and the print medium at the print region. Energizing signals are supplied to the thermal print elements representative of the image to be printed.

In one embodiment, the print medium is rotated by a rotatable platen; and the thermal printer functions to print color images on the print medium. An image of a respective color is printed for each rotation of the platen. After a predetermined number of rotations, with the consequential printing of corresponding color images, the printing operation is completed and the print medium may be replaced by a fresh medium upon which another color image is printed.

In accordance with another aspect of this invention, the web of thermally transferable material is provided with index marks to indicate the boundaries between adjacent frames of different colors of thermally transferable material. After a color image is printed from one frame, the web is advanced rapidly until an index mark is detected, thereby representing that the beginning of the next frame of thermally transferable color material is in position for printing.

In accordance with a still further aspect of this invention, the web is provided with index marks to indicate the beginning of a sequence of frames of colors of thermally transferable material. After an entire sequence of frames is used for printing a color image, the web is rewound until an index mark is sensed, thereby bringing the beginning of a sequence of frames into position for printing. This rewind operation is carried out a predetermined number of times so that the same sequence of frames is used for printing multiple color images. Thereafter, the web is not rewound, and the next sequence of frames is brought into position for printing the next color image.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
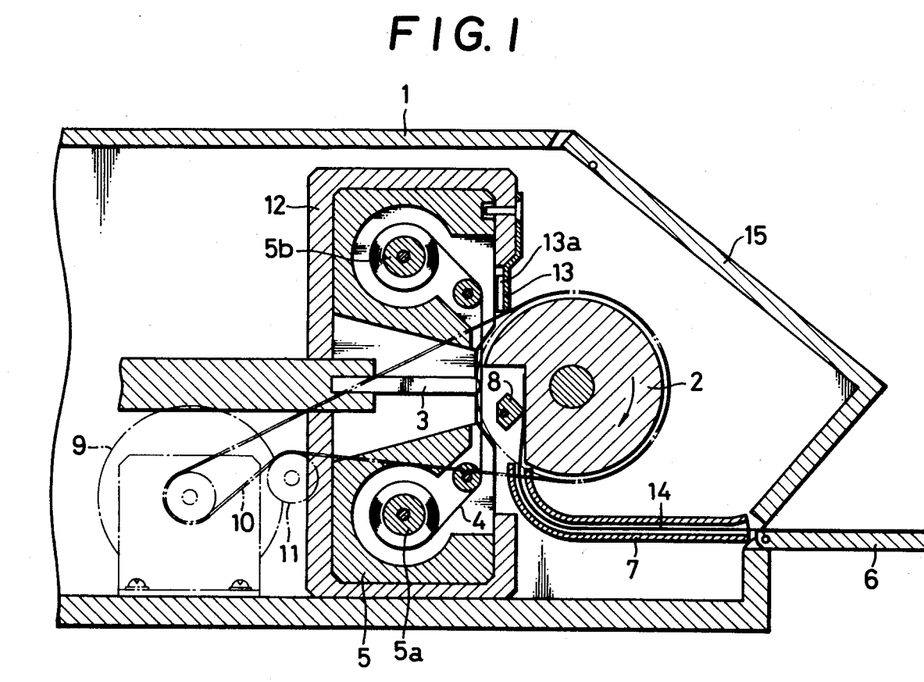
FIG. 1 is a partial sectional view of thermal printing apparatus incorporating the present invention.

Referring now to the drawings, wherein like reference numerals are used throughout, FIG. 1 is a partial sectional view of a thermal color print apparatus in accordance with the present invention. The print apparatus includes a housing 1 provided with an access door, or cover 15, and a print medium feed tray 6. For the purpose of the present discussion, it will be assumed that the print medium is plain paper. However, it will be appreciated that the print medium may be specially treated paper or any other medium upon which a color image is to be printed.

Within housing 1 are disposed a rotatable platen 2 mechanically coupled to a drive motor 9 via a belt 10 which is deployed about a tension pulley 11. Platen 2 is adapted to receive and secure a sheet of paper 14 that is fed thereto from feed tray 6 through a paper guide 7 by suitable sheet-feeding means (not shown) which may be of conventional design known to those of ordinary skill in the art. Platen 2 is provided with a longitudinal notch or cut-out portion (best seen in FIGS. 2 and 3) in which is located a paper clamp 8. As shown in FIG. 1, clamp 8 is adapted to clamp the leading edge of a sheet of paper 14 in the notch or cut-out portion of platen 2 such that the paper is moved, or driven, as the platen rotates.

Paper 14 is rotated by platen 2 from a reference position, such as shown in FIG. 1, past a fixed print region at which a thermal print head 3 is fixedly disposed. The print head is selectively energizable to thermally print images on paper 14.

A web 4 of thermally transferable material is bi-directionally movable between a supply reel 5a and a take-up reel 5b. Preferably, the web and its supply and take-up reels are housed within a cassette 5. Web 4 has a run interposed between platen 2 and thermal print head 3 at the print region. As will be explained, the web is formed with a repeated sequence of respective frames of thermally transferable material, each frame in a sequence having a different color. For example, each sequence of frames may include a frame of yellow thermally transferable material followed by a frame of magenta thermally transferable material followed by a frame of cyan thermally transferable material. This sequence of yellow, magenta and cyan is repeated. The thermally transferable material may be formed of a suitable dye, thermally activatable ink or, preferably, a sublimable material which vaporizes in response to heat applied thereto, transfers to paper 14 and then condenses thereon.

As illustrated, cassette 5 is adapted to be received in a cassette holder 12 provided within housing 1. In the embodiment described herein, a mounting assembly 13, which may be formed of any suitable material, such as metal, is affixed to cassette holder 12 and is provided at a free end portion 13a thereof with sensing apparatus for sensing the frames of thermally transferable material of web 4, as will be described. In the embodiment described herein, such sensing apparatus functions to sense, or detect, index marks which are provided on the web.

In operation, a sheet of paper 14 is fed from feed tray 6 through paper guide 7 to the notch or cut-out of platen 2 to be secured, or clamped, by paper clamp 8. Then, after paper 14 is clamped to platen 2, motor 9 is energized, as by the actuation of a suitable START switch.

Motor 9 drives belt 10 which, in turn, rotates platen 2 in the direction indicated by the arrow. As the platen rotates, it brings successive, continuous areas of paper 14 into the print region opposite thermal print head 3. Web 4 is pinched between the thermal print head and the paper. Energizing signals, such as color video signals, are supplied to thermal print head 3 and selectively energize the thermal elements included in that print head so as to transfer the material from respective frames on web 4 to paper 14. As platen 2 undergoes its first rotation to move paper 14 from the illustrated reference position thereof through the print region, thermal print head 3 is energized to print a color image on the paper. The color of this image is determined by the color of the thermally transferable material contained in the frame of web 4 that now is driven past the print region. It is appreciated that both paper 14 and web 4 are driven concurrently so as to advance fresh portions of the web through the print region as the paper is moved therepast.

After one complete frame of the video image has been printed, platen 2 rotates to its predetermined, or "home" position in preparation for the printing of another color image superimposed onto the first.

Platen 2 then is rotatably driven to move paper 14 through the print region once again. This time, the next frame in the sequence of thermally transferable material in web 4 also is driven through the print region. Thermal print head 3 is energized in response to energizing signals supplied thereto, such as video signals representing the image of a respective color, thereby printing the next color image superimposed onto the first on paper 14.

When the platen completes its rotation, the next frame of thermally transferable material of web 4 is moved past the print region and, concurrently, the platen is rotated once again. As before, paper 14 is moved from its reference position through the print region; and energizing signals are supplied to thermal print head 3 to print the next color image superimposed onto the first two.

As an example, if it is assumed that the sequence of frames of thermally transferable material of web 4 is formed of a frame of yellow material followed by a frame of magenta material followed by a frame of cyan material, when platen 2 undergoes its first rotation, a color image is printed thereon in response to the selective thermal activation of the yellow material. Thus, a yellow-derived image is printed on the paper. Then, when platen 2 undergoes its next rotation, the frame of magenta material moves past the print region so as to print a "magenta-derived" image superimposed onto and in registration with the preceding yellow-derived image. Finally, when the platen undergoes its third rotation, the frame of cyan material moves past the print region so as to print a cyan-derived image superimposed onto and in registration with the preceding yellow-derived and magenta-derived images. The registration of these three separate color images results in a full color image derived from, for example, a frame or field of color video signals.

Figure 2:
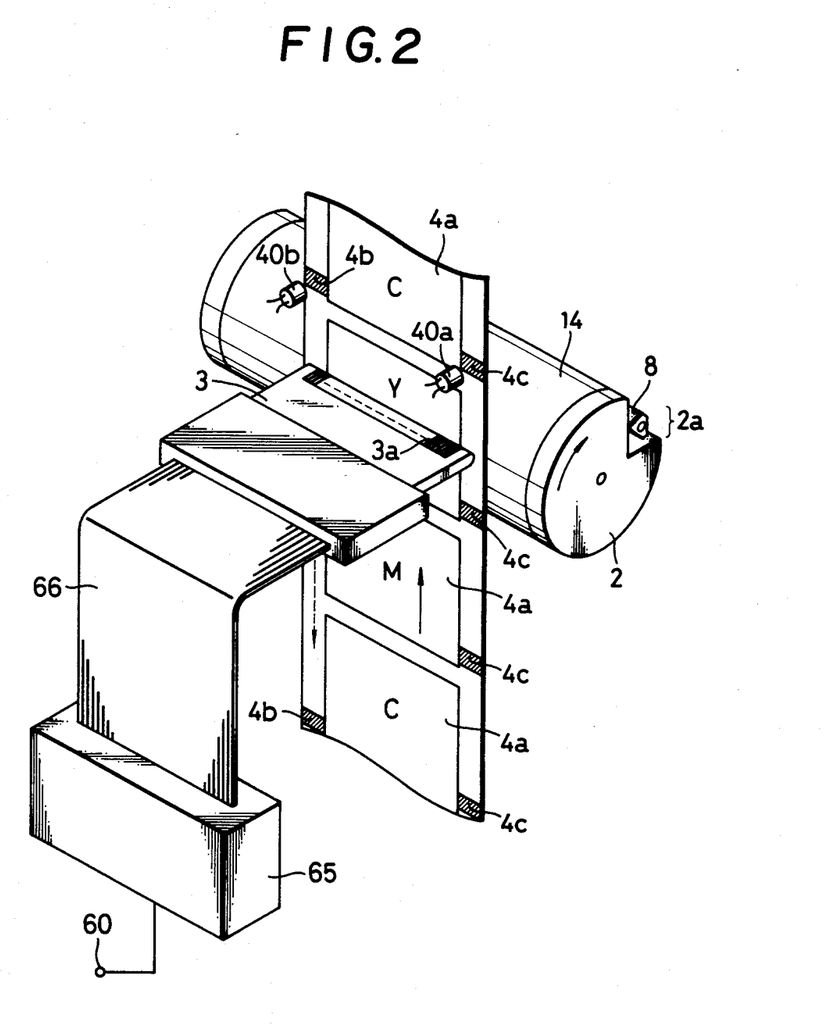
FIG. 2 is a perspective view of a portion of the printing apparatus shown in FIG. 1.

Referring now to FIG. 2, there is illustrated, in greater detail, the cooperation between platen 2, thermal print head 3, web 4 and paper 14. It is seen that the thermal print head is comprised of a plurality of discrete thermal elements 3a. When the illustrated apparatus is used to print images derived from composite color television signals, the number of thermal elements 3a will be equal to the number of horizontal lines included in a displayed television picture that may be derived from those composite color television signals. For example, if the television picture is formed of 512 horizontal lines, then thermal print head 3 may be formed of 512 thermal elements 3a. The thermal print head is coupled via a flat connecting cable 66 to a signal processing circuit 65 which, in turn, is adapted to receive color video signals supplied to an input terminal 60 thereof. The color video signals may include the usual luminance component Y and the usual chrominance component. Signal processing circuit 65 may be of a type known to those of ordinary skill in the prior art and adapted to produce complementary color signals derived from the luminance and chrominance components. For example, the signal processing circuit may produce yellow video signals by subtracting the blue color signals of the chrominance component from the luminance component, magenta video signals by subtracting the green color signals from the luminance component, and the cyan video signals by subtracting the red color signals from the luminance component. These complementary color video signals, that is, the yellow, magenta and cyan video signals, are used in sequence to derive energizing signals for thermal print head 3.

As best seen in FIG. 2, web 4 is comprised of repeated sequences of frames of yellow, magenta and cyan thermally transferable material. The web is driven to move concurrently with the rotation of platen 2. Hence, as paper 14 moves through the print region, a respective frame of web 4 concurrently moves through that print region. Thermal elements 3a are selectively energized so as to selectively transfer the material from the frame to the paper thus printing a video image of the corresponding color. It will be appreciated that, while the frame of yellow material moves past the print region, print head 3 is supplied only with energizing signals derived from the yellow video signals. When the frame of magenta material moves past the region, the thermal print head is supplied only with energizing signals derived from the magenta video signals. Finally, when the frame of cyan material moves past the print region, thermal print head 3 is supplied only with energizing signals derived from the cyan video signals. Hence, only one color is printed at a time, depending upon the particular frame of material which then moves past the print region and the color video signals then used to supply energizing signals to the thermal print head.

Index marks 4b are provided along one longitudinal edge of frame 4. These index marks 4b indicate the beginning of a sequence of frames of colors of thermally transferable material. Hence, the successive frames of yellow, magenta and cyan colors, respectively, are provided between adjacent index marks 4b.

Web 4 also is provided with index marks 4c on the other, opposite longitudinal edge thereof. These index marks 4c indicate the boundaries between adjacent frames. Hence, an index mark 4c indicates the boundary between the yellow and magenta frames, another index mark 4c indicates the boundary between the magenta and cyan frames, and yet another index mark 4c indicates the boundary between the cyan and yellow frames.

Index marks 4b and 4c may be optically detectable marks, and each is adapted to be detected by a respective photodetector. As an example, photodetector 40a is provided to detect, or sense, index marks 4c; and photodetector 40b is adapted to detect, or sense, index marks 4b. Alternatively, the respective marks may be magnetic indicia, electrically conductive strips, or the like, such marks being detectable by magnetic or conductive pick-up devices, respectively. As will be described below, the detected, or sensed, index marks serve to control the drive motors (not shown) which are used to move web 4 past the print region. This insures proper registration of a respective color frame relative to paper 14 such that a complete color image may be printed on the paper as it is moved through the print region by the rotation of platen 2.

In operation, signal processing circuit 65 serves to derive the yellow, magenta and cyan video signals from the luminance and chrominance components of a color television signal supplied thereto from input terminal 60. The signal processing circuit operates to sample the yellow video signal, for example, so as to produce a number of samples in each of 512 (for example) horizontal lines. As a numerical example, each horizontal line is sampled to produce 1,024 samples (or picture elements) representing one line of the yellow image in the corresponding video picture. As web 4 and paper 14 move through the print region, samples are supplied to thermal elements 3a representing "vertical columns" of the yellow image. It will be appreciated, from the foregoing example, that 1,024 vertical columns are printed for each pass of paper 14 and each frame of web 4 through the print region. (In FIG. 2, a vertical column on paper 14 appears as a horizontal row in the figure.) After these 1,024 columns of the yellow image are printed, the foregoing operation is repeated for the next pass of paper 14 and the next pass of the magenta frame of web 4 through the print region. Thus, 1,024 successive columns of the magenta image are printed. Then, this operation is repeated once again for the next pass of paper 14 and the cyan frame of web 4 through the print region. It is recognized that the magenta and cyan images are printed in superimposition over the yellow image. As a result of these three separate, successive printing operations, a composite color image is printed on paper 14.

In the preferred embodiment illustrated in FIG. 2, thermal elements 3a are aligned in a linear array. The length dimension of this array is equal to the vertical height of the image which is printed upon paper 14. It is seen that web 4 exhibits a width dimension, as viewed in FIG. 2, which is at least equal to the length dimension of thermal print head 3. Thus, a strip, or vertical column, of images is printed on paper 14 by the selective energization of thermal elements 3a in substantially a single energizing operation. From the foregoing example, it is recognized that 1,024 successive energizing operations are needed to print one complete frame of the color image.

As an alternative, a single print element may scan a raster across each color frame of web 4 as paper 14 moves through the print region. That is, the single thermal element may be driven in the width direction to scan successive columns (or, as viewed in FIG. 2, successive rows) of a frame of thermally transferable material. Since the use of a single thermal element is a relatively complex and "slow" printing process, it is preferred to utilize the array of thermal elements illustrated in FIG. 2 so as to print a single vertical column, or strip, of images in substantially in a single energizing operation. Moreover, it is preferred that the array of thermal elements be aligned in parallel with the axis of rotation of platen 2.

In one application of the thermal print apparatus illustrated herein, the composite color video signals supplied to input terminal 60 may represent a "still" picture and may be reproduced from a suitable magnetic record medium, such as a magnetic disc. Alternatively, the signals reproduced from a single track of video tape may be supplied to input terminal 60. Still further, a suitable memory device may be provided in which the color video signals that represent a single field or frame are stored, and such stored signals may be supplied to the input terminal. As a further alternative, color video signals that are produced by scanning a "hard copy" picture may be supplied to input terminal 60. Also, although the illustrated apparatus is particularly adapted to print color video signals, such apparatus may be modified so as to print monochrome, or black-and-white, images. In this modification, the video signals supplied to signal processing circuit 65 may be merely a single field or frame of monochrome video signals, such as a conventional luminance video component.

To summarize, when the illustrated apparatus is used to print a color image, color video signals are supplied to signal processing circuit 65 whereat they are separated into complementary color components such as the yellow, magenta and cyan components. Each separate component is sampled so as to produce complementary color samples corresponding to a vertical column of the color image. All of the samples in a respective column for a particular color are supplied concurrently to thermal print head 3 so as to print a column, or strip, of images of the corresponding color on paper 14. As platen 2 rotates to bring the next adjacent portion of the paper into the print region, or into thermal transfer relationship with respect to web 4, the web is advanced and thermal print head 3 is energized so as to print the next vertical column on the paper. This process is repeated until all of the vertical columns have been printed, thus printing an image of a respective color. Then, platen 2 will have rotated so as to return the paper to its reference position and web 4 will advance so as to bring the next frame (i. e. the magenta frame) into position to be selectively transferred. Then, the next image (i. e. the magenta image) is printed in the foregoing manner. At the conclusion of the printing of this color image, platen 2 rotates to bring paper 14 to its reference position, and the next frame (i. e. the cyan frame) of web 4 is advanced to the print region. This last frame of cyan material then is selectively transferred to paper 14, thereby resulting in the registration of three superimposed yellow, magenta and cyan images. Hence, paper 14 has a color image printed thereon.

Figure 3:
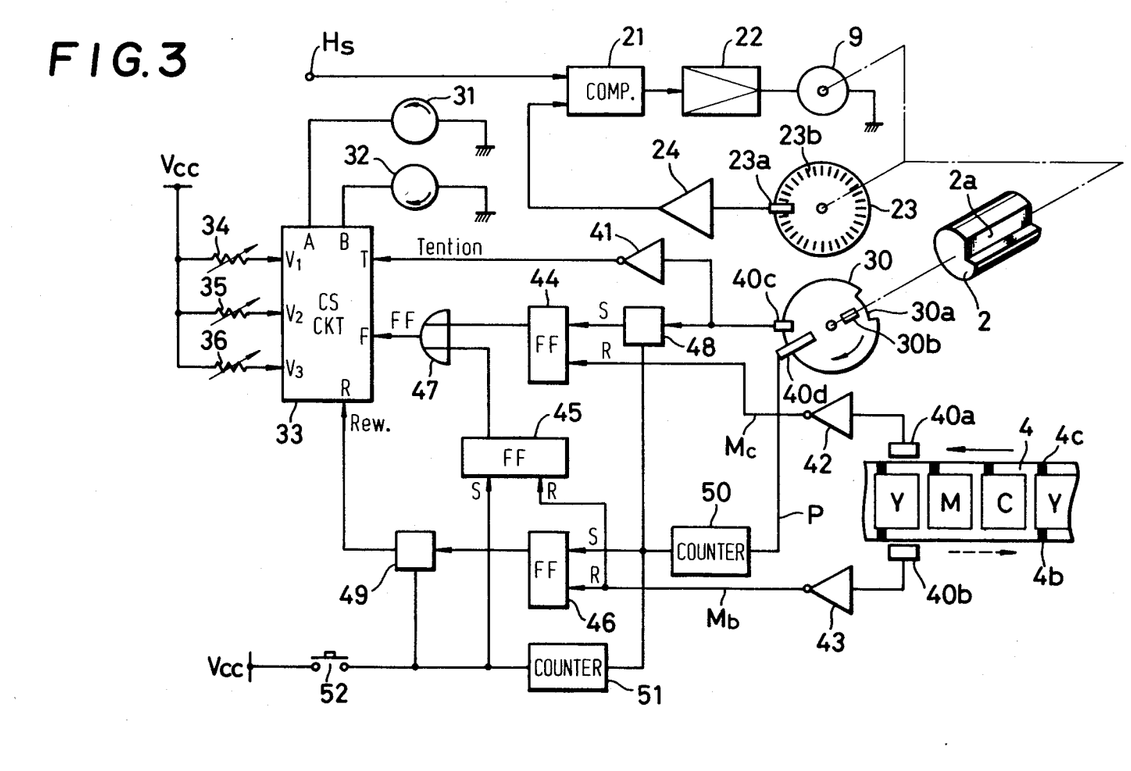
FIG. 3 is a partial block, partial logic diagram of control circuitry which is used with the present invention.

Referring now to FIG. 3, there is illustrated a partial block, partial logic diagram of drive control circuitry which is used to control the movement of web 4. This Figure also illustrates a portion of motor control circuitry that is used to control motor 9 for the rotation of platen 2. The circuitry for controlling motor 9 includes a disc 23, a pick-up device 23a and a comparator 21. Disc 23 may be mechanically coupled to or mounted on an end face of platen 2. The disc is provided on the periphery thereof with uniformly spaced indicia 23b. For example, such indicia may be optically detectable marks, magnetic elements, or the like. As motor 9 drives platen 2, disc 23 rotates therewith.

Pick-up device 23a is adapted to detect the peripheral indicia 23b on disc 23. If, as mentioned above, indicia 23b are optically detectable, pick-up device 23a may comprise a conventional photodetector. Alternatively, if indicia 23b are magnetic elements, pick-up device 23a may comprise a magnetic sensor. As disc 23 rotates, pick-up device 23a generates pulses in response to the detection of indicia 23b. These pulses are produced at a frequency determined by the rate at which motor 9 rotates platen 2. Such pulses are supplied to one input of comparator 21 via an amplifier 24.

The other input of comparator 21 is coupled to an input terminal $H_s$ to which is supplied a synchronizing pulse derived from the television signals which are used to selectively energize thermal print head 3. For example, these synchronizing pulses may comprise the conventional vertical sync pulses which identify the field intervals of the television signal. Alternatively, the pulses supplied to input terminal $H_s$ may be synchronized with the frame interval of the television signal. Comparator 21 is adapted to compare the synchronizing pulses received at input terminal $H_s$ with the pulses produced by detector 23a and to produce an error signal in response to a phase differential therebetween. This error signal is supplied to motor 9 via an amplifier 22 to adjust the energization of the motor and thereby adjust the rotation of platen 2. Thus, motor 9 is controlled by a servo circuit so as to drive platen 2 in synchronism with the pulses derived from the television signal which is used to energize thermal print head 3. Accordingly, paper 14 is brought into proper registration with the print region in synchronism with the received television signal. In this manner, the color image is printed on the paper in proper synchronism with the energizing signals.

The circuitry which is used to control the movement of web 4 is comprised of take-up and supply reel drive motors 31 and 32, respectively, a position sensing disc 30 coupled to platen 2 and rotatable therewith, a voltage generator 33, index mark sensors 40a and 40b, set/reset (or R/S) flip-flop circuits 44, 45 and 46 and counters 50 and 51. Position sensing disc 30 is provided with a notch 30a in alignment with the notch, or cut-out portion 2a of platen 2. The position sensing disc also is provided with an indicium 30b. Notch 30a is adapted to be sensed by a suitable detector 40c; and indicium 30b is adapted to be sensed by a detector 40d. Detectors 40c and 40d are fixedly disposed and, for example, may comprise photodetectors or other conventional pick-up devices adapted to sense notch 30a and indicium 30b, respectively. It will be appreciated that the cooperation between notch 30a and detector 40c serves to produce a predetermined signal when platen 2 rotates its notch or cut-out portion 2a to a predetermined angular position and while the notch or cut-out portion of the platen rotates through a predetermined angular range. In particular, notch 30a and detector 40c function to sense when the notch or cut-out portion of platen 2 is positioned in the print region. Indicium 30b and detector 40d cooperate to sense when platen 2 rotates to its reference, or "home" position. Detectors 40c and 40d may be positioned so as to produce output signals substantially coincidentally. In one embodiment, the signal produced by detector 40c lags the signal produced by detector 40d.

Sensors 40a and 40b are adapted to sense index marks 4c and 4b, respectively, as discussed above with respect to the embodiment shown in FIG. 2. As mentioned previously, the sensing of index marks 4c indicates when a frame of thermally transferable material has been moved to the print region. The sensing of an index mark 4b indicates the beginning of a sequence of frames at the print region. The output of sensor 40a is coupled to the reset input of flip-flop circuit 44 by, for example, a logic inverter circuit 42. Similarly, sensor 40b is coupled to the reset input of flip-flop circuit 46 by another inverter 43. The set input of flip-flop circuit 44 is coupled to detector 40c through a gate circuit 48; and the set input of flip-flop circuit 46 is coupled to the output of counter 50 whose input is supplied with pulses produced by detector 40d. The output of counter 50 also is coupled to another input of gate circuit 48 and is adapted to enable this gate circuit until a predetermined count is attained, whereupon gate circuit 48 is disabled. The output of counter 50 also is coupled to the input of counter 51.

Sensor 40b also is coupled via inverter 43 to the reset input of flip-flop circuit 45. The set input of this flip-flop circuit is coupled to the output of counter 51. It will be appreciated that flip-flop circuit 45 is adapted to be set when counter 51 attains a predetermined count. Flip-flop circuits 44 and 45 are coupled to a fast-forward input of voltage generator 33 via an OR-gate 47. The OR-gate is adapted to produce a fast-forward command signal when either flip-flop circuit 44 or flip-flop circuit 45 assumes its set state.

The output of counter 51 is coupled to an enable input of a gate circuit 49, this gate circuit having another input coupled to the output of flip-flop circuit 46. The output of gate circuit 49 is coupled to a rewind input of voltage generator 33 and is adapted to produce a rewind command signal when flip-flop circuit 46 assumes its set state and counter 51 has not yet reached its predetermined count. The enable input of gate circuit 49 also is coupled to a source of energizing potential $V_{cc}$ via a switch, such as a push-button switch 52.

Voltage generator 33 also includes a tension input which is coupled to detector 40c via an inverter 41. The voltage generator includes an output terminal A coupled to take-up reel drive motor 31 and an output terminal B coupled to supply reel drive motor 32. Output terminals A and B are adapted to supply respective energizing voltages to the take-up and supply reel drive motors such that these motors are selectively energized to exert a tension on web 4 therebetween, or to rapidly advance the web in a fast-forward direction, or to rapidly rewind the web in a rewind direction. A normal forward-drive energizing voltage also is supplied to take-up reel drive motor 31; but in the interest of simplification, this normal forward-drive voltage is not shown.

Voltage generator 33 includes voltage input terminals connected to receive three respective voltages $V_1$, $V_2$ and $V_3$. These voltages are derived from the source of energizing potential $V_{cc}$ via respective voltage-adjustment circuits, such as voltage-divider potentiometers 34, 35 and 36, respectively. These voltage-adjustment circuits, or potentiometers, are preset such that the $V_3 > V_2 > V_1$. The tension, fast-forward and rewind command signals are supplied to the tension, fast-forward and rewind inputs, respectively, of voltage generator 33 to establish the energizing voltages produced at output terminals A and B. When the tension command signal is supplied, the voltage $V_2$ is produced at each of output terminals A and B. This applies equal and opposite energizing voltages to the pick-up and supply reel drive motors so as to exert a suitable tension on web 4 therebetween. When the fast-forward command signal is produced, voltage $V_3$ is supplied to output terminal A and voltage $V_1$ is supplied to output terminal B. Consequently, since a greater energizing voltage is supplied to take-up reel drive motor 31, web 4 is advanced rapidly in the fast-forward direction. Finally, when the rewind command signal is produced, voltage $V_3$ is supplied to output terminal B and voltage $V_1$ is supplied to output terminal A. The greater energizing voltage now is supplied to supply reel drive motor 32, thereby rewinding web 4 rapidly.

The manner in which the web-drive control circuitry operates now will be described. Reference also will be made to the waveform diagrams shown in FIGS. 4A-4E to facilitate this description. Let it be assumed that, initially, platen 2 is disposed in its reference, or home position. Accordingly, notch 30a of position sensing disc 30 is detected by detector 40c to produce a binary "1", for example. Let it further be assumed that flip-flop circuits 44, 45 and 46 all assume their respective reset states. As will become apparent from the following description, the beginning of a sequence of frames of web 4 now is positioned at the print region, and at this time, none of the tension, fast-forward or rewind command signals is produced.

Figure 4:
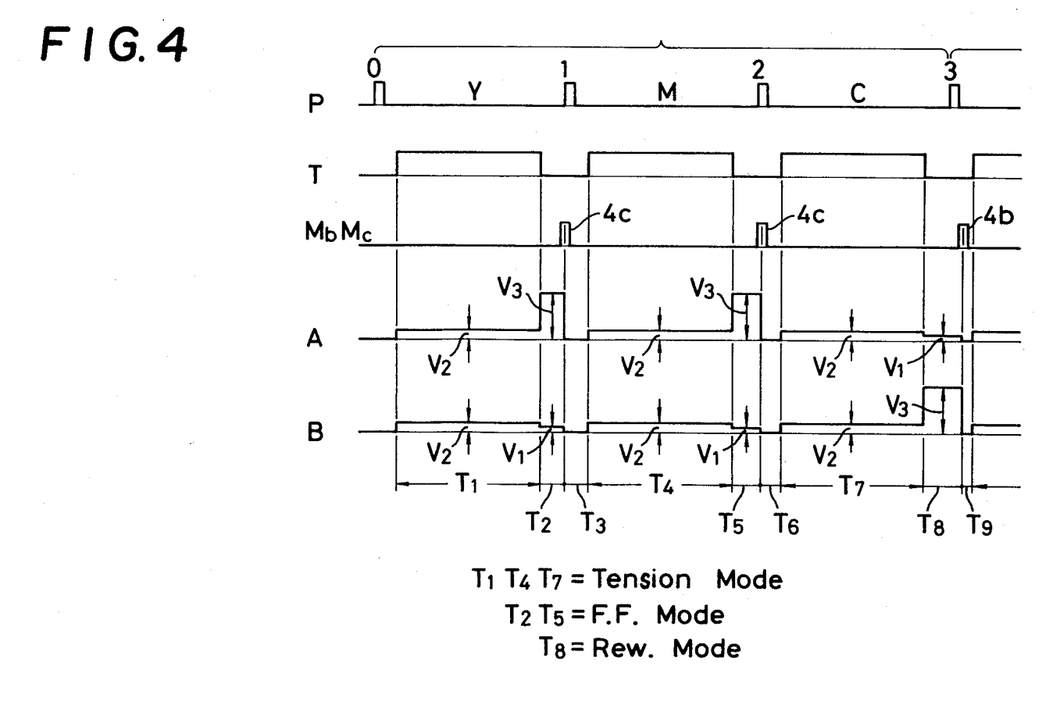
FIGS. 4A–4E are waveform diagrams which are useful in understanding the operation of the present invention.

Upon operation of a START switch (not shown), motor 9 operates in synchronism with the synchronizing signals supplied to input terminal $H_s$, as described above, to rotate platen 2. The platen thus rotates, or moves, paper 14 (which is secured thereto via paper clamp 8), toward the print region. When the paper is suitably brought to the print region, notch 30a rotates beyond detector 40c, whereupon the latter produces a binary "0". This signal is inverted by inverter 41 and supplied as a binary "1" tension command signal to voltage generator 33. Hence, the voltage $V_2$ is supplied to each of take-up and supply reel drive motors 31 and 32, as shown in FIGS. 4D and 4E. This exerts proper tension on web 4 which is driven in the forward direction concurrently with the rotation of platen 2. Energizing signals now supplied to thermal print head 3 result in the printing of a color image on paper 14. For example, a yellow image is printed on the paper, this yellow image being produced in response to the energizing signals now supplied to the thermal print head by signal processing circuit 65 (FIG. 2) and derived from the yellow video signals.

As platen 2 continues to rotate, notch 30a is rotated into juxtaposition with detector 40c and indicium 30b is sensed by detector 40d. At that time, detector 40c produces a binary "1" which terminates the tension command signal, as shown in FIG. 4B. The tension command signal thus had been produced during the duration $T_1$. Now, however, the binary "1" produced by detector 40c is supplied by gate circuit 48 to the set input of flip-flop circuit 44. This flip-flop circuit assumes its set state so as to supply the fast-forward command signal to voltage generator 33. Accordingly, the voltage generator supplies the voltage $V_3$ to take-up reel drive motor 31 and the voltage $V_2$ supply reel drive motor 32, as shown in FIGS. 4D and 4E. Therefore, web 4 is driven in the fast-forward direction.

When the web is sufficiently advanced such that the frame of magenta material now is disposed at the print region, the index mark associated therewith is sensed by sensor 40a. The sensor produces a binary "0", for example, which is inverted by inverter 42 to supply a binary "1" reset pulse, identified as reset pulse $M_c$ in FIG. 4C, to the reset input of flip-flop circuit 44. This flip-flop circuit is reset to terminate the fast-forward command signal, whereupon voltage generator 33 now supplies equal voltages of, for example, zero volts to output terminals A and B. From FIGS. 4D and 4E, it is seen that the fast-forward command signal is produced during the duration $T_2$; and web 4 is rapidly advanced in the fast-forward direction during this duration.

As mentioned above, indicium 30b has been detected by detector 40d to produce a pulse to increment counter 50. While platen 2 continues to rotate, position sensing disc 30 likewise rotates therewith, and when the platen rotates sufficiently to dispose paper 14 at the print region once again, detector 40c detects the termination of notch 30a so as to produce a binary"0". Accordingly, as described above, inverter 41 supplies the binary "1" tension command signal to voltage generator 33. The voltage generator now supplies the voltage $V_2$ to each of the take-up and supply reel drive motors, thereby exerting proper tension in web 4. A magenta image now is printed on paper 14 in response to the energizing signals derived from the video signals supplied to signal processing circuit 65.

Platen 2 continues to rotate and, thus, the magenta image continues to be printed, until the platen rotates to bring the leading edge of notch 30a opposite detector 40c. At that time, indicium 30b is detected by detector 40d to increment counter 50 to a count of two, and detector 40c produces a binary "1" to terminate the tension command signal. This binary "1" is supplied through gate circuit 48 to flip-flop circuit 44. Accordingly, and as described above, the fast-forward command signal is supplied to voltage generator 33; and the voltage generator supplies voltages $V_3$ and $V_1$ to take-up and supply reel drive motors 31 and 32, respectively, so as to drive web 4 in the fast-forward direction. Thus, and as illustrated in FIGS. 4D and 4E, tension is exerted on web 4 during the duration $T_4$, and the web is advanced rapidly in the forward direction for the duration $T_5$.

When the cyan frame of thermally transferable material is advanced to the print region, the index mark associated therewith is sensed by sensor 40a, resulting in the reset signal $M_c$ shown in FIG. 4C. Flip-flop circuit 44 thus is reset to terminate the fast-forward command signal. The fast-forward voltages supplied to the take-up and supply reel drive motors thus are terminated at the completion of duration $T_5$, as illustrated in FIGS. 4D and 4E.

The foregoing operation now is repeated so that the cyan image is printed on paper 14. Thus, as platen 2 continues to rotate so as to move the paper to the print region, the trailing edge of notch 30a is detected by detector 40c. This results in the tension command signal, whereupon the tension voltages $V_2$ are supplied to each of take-up and supply reel drive motors 31 and 32 by voltage generator 33. Proper tension now is exerted upon web 4 and as the frame of cyan material is transported past thermal print head 3, a cyan image is printed on paper 14 in response to the energizing signals derived from the video signals supplied to signal processing circuit 65. This tension is applied during the duration $T_7$ shown in FIGS. 4D and 4E.

Now, when platen 2 rotates sufficiently, the leading edge of notch 30a is detected by detector 40c so as to terminate the tension command signal and indicium 30b is detected by detector 40d to increment counter 50 to its predetermined count (e. g. the count of three). The counter now supplies a disable signal to gate circuit 48 so as to disable the gate circuit from transmitting the set signal from detector 40c to flip-flop circuit 44. Accordingly, after a sequence of frames (i. e. after the yellow, magenta and cyan frames) has been transported past the print region, the fast-forward command signal is not produced. Rather, the disable signal produced by counter 50 now increments counter 51 (e. g. to a count of one) and sets flip-flop circuit 46. Flip-flop circuit 46 transmits the rewind command signal through gate circuit 49 to the rewind input of voltage generator 33. As will be explained below, this gate circuit is enabled until counter 51 is incremented to its predetermined count. However, in accordance with the presently described example, counter 51 has not yet reached its predetermined count. Hence, voltage generator 33 now supplies the voltage $V_3$ to supply reel drive motor 32 from its output terminal B, and the voltage $V_1$ to take-up reel drive motor 31 from its output terminal A. Motors 31 and 32 thus are energized to rewind web 4.

As the web is rewound, indicated by the broken arrow shown in the lower right-hand portion of FIG. 3, sensor 40a senses the index marks which indicate the boundaries between adjacent frames. However, such sensed index marks merely reinforce the resetting of flip-flop circuit 44. When web 4 is fully returned to the beginning of the sequence of frames which have just passed the print region, sensor 40b senses the index mark 4b which indicates the beginning of this sequence. As a consequence thereof, sensor 40b produces a binary"0" which is inverted by inverter 43 and supplied as the reset pulse $M_b$ shown in FIG. 4C. This reset pulse resets flip-flop circuit 46 to terminate the rewind command signal. Hence, voltage generator 33 terminates the voltages $V_3$ and $V_1$ supplied to supply and take-up reel drive motors 32 and 31, respectively, as shown in FIGS. 4D and 4E. Thus, web 4 is rewound for the duration $T_8$. Web 4 thus is returned to the beginning of the sequence of frames at which the aforedescribed sequential color image printing operation commenced.

Although not shown herein, it may be appreciated that, if desired, the output signal produced by counter 50 which disables gate circuit 48 and sets flip-flop circuit 46 also may be used to deenergize platen drive motor 9. This serves the function of arresting the rotation of the platen after the complete color image has been printed and thereby permit paper 14 to be easily removed therefrom and a fresh sheet of paper to be clamped thereon.

When the next sheet of paper is clamped to platen 2, the operation described above is repeated. Thus, after one frame of thermally transferable material is used for the printing of a color image, web 4 is rapidly advanced to dispose the next frame in position for printing. Since the rapid movement of web 4 is initiated when platen 2 rotates to position its notch, or cut-out portion 2a opposite thermal print head 3, it is seen that the web is advanced during those durations ($T_2$ and $T_5$ shown in FIGS. 4D and 4E) when the web is not in contact with paper 14. Furthermore, web 4 advantageously is stopped after its rapid advance until platen 2 rotates sufficiently to move a predetermined portion of paper 14 (e. g. the leading edge thereof) to the print region. As a result, the movement of web 4 is, at least in part, synchronized with the rotation of platen 2 to insure proper sequential printing and registration of the color images.

From the foregoing description, it is appreciated that a sequence of frames of thermally transferable material is reused a number of times. Counter 50 produces its output signal after platen 2 has been rotated three times and, thus, this output signal is produced after a sequence of frames has been transported past the print region. Each signal produced by counter 50 thus represents one use of the sequence of color frames. These signals are counted by counter 51 which, it is appreciated, counts the number of times a sequence of frames is reused. When a sequence is reused a predetermined number of times, counter 51 will be incremented to a preset count, whereupon the counter produces an output signal which disables gate circuit 49 and sets flip-flop circuit 45. By disabling gate circuit 49, the rewind command signal is inhibited. Thus, when counter 50 increments counter 51 to produce the output signal of the latter and, also, sets flip-flop circuit 46, the disabling of gate circuit 49 prevents the set state of flip-flop circuit 46 from being transmitted as the rewind command signal.

It is recognized that counter 51 will be incremented to reach its preset count after a complete sequence of frames has been used. In the example illustrated in FIG. 3, counter 51 will produce its aforementioned output signal after a frame of cyan material is used to print a cyan image on paper 14. The setting of flip-flop circuit 45 in response to the output signal produced by counter 51 supplies the fast-forward command signal to voltage generator 33 via OR-gate 47. Hence, web 4 now is rapidly advanced until the next index mark 4c, associated with the frame of yellow material, is sensed by sensor 40a. At that time, index mark 4b, which is associated with the next sequence of frames, also will be sensed by sensor 40b. Accordingly, sensors 40a and 40b supply reset pulses to flip-flop circuits 44 and 45, respectively, thereby resetting both of these flip-flop circuits so as to terminate the fast-forward command signal. Pulse $M_b$ derived from sensor 40b also is used to reset flip-flop circuit 46; and thereby all of the flip-flop circuits are reset in preparation for the next sequential printing operation.

From the foregoing description, it is seen that when a sequence of three frames of color material is provided on web 4, counter 50 may be a resettable or circulating counter adapted to count 0, 1, 2, 0, 1, 2, 0, . . . This counter produces an output pulse when its count is incremented from the count of 3 to the count of 0.

Likewise, counter 51 may comprise a resettable, circulating counter adapted to count to any desired preset value. For example, when the illustrated printing apparatus is used to print images representing a scene, or a picture, counter 51 may be adapted to count 0, 1, 2, 3, 0, 1, 2, 3, 0, 1, . . . Of course, the preset count to which counter 51 is incremented may be selected as desired. If it is found through use of the apparatus that the quality of the printed images is degraded after only three separate pictures, or prints, are made, then the preset count of counter 51 may be changed such that the counter repeatedly counts 0, 1, 2, 0, 1, 2, etc. Alternatively, the preset count of counter 51 may be increased if it is found that the quality of the prints is satisfactory even after a larger number of separate prints, or pictures, is made. As another example, if the illustrated apparatus is used to print alphanumeric images, then the preset count of counter 51 may be substantially increased without noticeable degradation in the quality of the printed images. This means that the very same sequence of frames on web 4 may be reused a large number of times.

Switch 52 is adapted to be manually closed to simulate the output of counter 51. When this switch is closed, gate circuit 49 is disabled and flip-flop circuit 45 is set so as to advance web 4 in the fast-forward direction. Switch 52 may be closed by an operator if a degradation in the quality of the printed image is observed after a number less than the preset number to which counter 51 is adapted to count is made. For example, if counter 51 is adapted to produce its output signal after six separate color prints have been made, switch 52 may be closed if the operator observes a degradation in the quality of the printed image after only the third or fourth print has been made.

In the embodiment illustrated in FIG. 3, separate index marks 4b are shown, and these marks are separately sensed by sensor 40b. It may be appreciated that, if desired, index marks 4b may be omitted merely by providing a separate counter which counts the number of index marks that are sensed by sensor 40a. For example, that counter may produce an output signal corresponding to the aforementioned output pulse $M_b$ after every three index marks 4c have been counted. Still further, index marks 4c may be omitted if sensor 40a is capable of detecting the boundary between adjacent frames.

To summarize, web 4 is advanced such that a frame of, for example, yellow thermally transferable material moves through the print region, i. e., past thermal print head 3, while paper 14 also is moved therethrough, and the thermal print head is selectively energized so as to print a yellow image on the paper. When the paper returns to a reference position, that is, when platen 2 rotates to bring its notch, or cut-out portion 2a opposite print head 3, web 4 is rapidly advanced to bring the next frame of magenta material into printing position. Then, the magenta image is printed while paper 14 moves through the print region. When the paper once again returns to its reference position, the web is rapidly advanced to bring the cyan frame of material into position for the printing of a cyan image. Then, once the cyan image has been printed, web 4 is returned to the beginning of the yellow frame, that is, to the beginning of the sequence of frames so that this sequence can be reused to print another color image on another sheet of paper. After a particular sequence has been used a predetermined number of times, the web is advanced so as to position the next sequence of frames for a printing operation.

While the present invention has been particularly shown and described with reference to a preferred embodiment, it will be readily appreciated by those or ordinary skill in the art that various changes and modifications in form and details may be made without departing from the spirit and scope of the invention. Some of these changes and modifications have been suggested above. It is intended that the appended claims be interpreted as including these and other such changes and modifications.

What is claimed is:

1. In thermal print apparatus for printing images on a print medium, the combination comprising:
    a rotatable platen for receiving and rotating a print medium therewith;
    thermal print means adjacent said platen and selectively energizable to cause images to be printed on said print medium, said thermal print means having a dimension sufficient to cause a strip of images to be printed in substantially a single energizing operation;

a movable web of thermally transferable material having a run interposed between said platen and said thermal print means, said web having first index marks thereon indicating the boundaries between adjacent frames, and second index marks thereon indicating the beginning of a sequence of frames of respectively different colors of thermally transferable material arranged in repeated sequence;

transport means for moving said web in accord with said index marks;

input means for supplying energizing signals to said thermal print means representative of the image to be printed; and means for rotating said platen at a predetermined rate.

2. The apparatus of claim 1 wherein said movable web includes a cassette housing in which said web is contained.

3. The apparatus of claim 1; wherein said transport means includes drive means for moving said web; sensing means for sensing said index marks; and drive control means responsive to the sensed index marks for controlling said drive means and thereby control the movement of said web.

4. The apparatus of claim 1 wherein said platen rotates and said web moves concurrently.

5. The apparatus of claim 1; and wherein said transport means includes drive means for moving said web, sensing means for sensing said index marks, and drive control means responsive to the sensed index marks for controlling said drive means and thereby control the movement of said web.

6. The apparatus of claim: 5 wherein said drive control means includes detecting means for detecting when said platen has rotated to a predetermined position near to the end of a rotation; means for energizing said drive means in response to said detecting means for advancing said web at a rapid rate; and means for changing over said drive means to terminate said rapid rate in response to a sensed index mark; whereby said web is advanced rapidly from the end of a printed color image frame to the beginning of the next-following color image frame.

7. In thermal print apparatus for printing images on a print medium, the combination comprising:

a rotatable platen for receiving and rotating a print medium therewith;

thermal print means adjacent said platen and selectively energizable to cause images to be printed on said print medium, said thermal print means having a dimension sufficient to cause a strip of images to be printed in substantially a single energizing operation;

a movable web with successive frames of respectively different colors of thermally transferable material arranged in repeated sequence, said web having index marks thereon indicating boundaries between adjacent frames, said web being guided in a run interposed between said platen and said thermal print means;

drive means for moving said web and being selectively operable to rewind said web;

sensing means for sensing said index marks;

drive control means responsive to the sensed index marks for controlling said drive means, said drive control means including detecting means for detecting when said platen has rotated to a predetermined position near to the end of a rotation, means for energizing said drive means in response to said detecting means for advancing said web at a rapid rate, means for changing over said drive means to terminate said rapid rate in response to a sensed index mark, determining means for determining when all of the frames of colors of thermally transferable material in a sequence have been printed, and means responsive to said determining means for operating said drive means to rewind said web until the beginning of a sequence is brought into position for printing another color image;

input means for supplying energizing signals to said thermal print means representative of an image to be printed; and means for rotating said platen at a predetermed rate.

8. The apparatus of claim 7 wherein said web includes further index marks to indicate the beginning of a sequence of frames of colors of thermally transferable material; and wherein said drive control means further includes further sensing means for sensing said further index marks to terminate the rewind operation of said drive means.

9. The apparatus of claim 7 wherein said determining means comprises counting means for counting the rotations of said platen to indicate when said platen has rotated a number of time equal to the number of color frames of thermally transferable material in a sequence.

10. The apparatus of claim 9 wherein said platen has a "home" position; said drive control means includes means for detecting said "home" position; and said counting means counts each detection of said "home" position.

11. Thermal print apparatus for printing color images on a print medium, comprising:

means for repeatedly moving said print medium from a reference position thereof through a printing region;

thermal print means disposed at said printing region and selectively energizable to cause color images to be printed on said print medium wen said print medium is moved;

a movable web of thermally transferable material having a run interposed between said thermal print means and said print medium at said printing region, said web being provided with successive frames of respectively different colors of thermally transferable material arranged in repeated sequence and said web having a first set of index marks thereon indicating the boundaries between adjacent frames, and a second set of index marks thereon indicating the beginning of a sequence of frames of thermally transferable material;

drive means for bi-directionally driving said web;

sensing means for sensing said first and second set of index marks; and drive control means responsive to said sensing means for controlling said drive means to move one sequence of frames past said printing region a predetermined number of times to print a predetermined number of color images and then to move the next sequence of frames past said printing region.

12. The apparatus of claim 11 wherein said drive control means further includes means for controlling said drive means to advance said web rapidly past said printing region from the end of one frame to the beginning of the next frame.

13. In thermal print apparatus for printing images on a print medium, the combination comprising:

a rotatable platen for receiving and rotating a print medium therewith;

thermal print means adjacent said platen and selectively energizable to cause images to be printed on said print medium, said thermal print means having a dimension sufficient to cause a strip of images to be printed in substantially a single energizing operation;

a movable web having successive frames of respectively different colors of thermally transferable material arranged in repeated sequence with index marks indicating the beginning of each said sequence of said successive frames, said web having a run interposed between said platen and said thermal print means;

transport means including drive means with bi-directional drive means for moving said web, sensing means for sensing said index marks, and drive control means responsive to the sensed index marks for controlling said drive means to thereby control movements of said web, said drive control means controlling said drive means to reverse the movement of said web from a forward direction to a reverse direction when an index mark is sensed and from a reverse direction to a forward direction when a preceding index mark is sensed; and inhibit means for inhibiting said drive control means from reversing the movement of said web after the movement of said web has been reversed a predetermined number of times;

input means for supplying energizing signals to said thermal print means representative of the image to be printed; and means for rotating said platen at a predetermined rate.

* * * * *